United States Patent
Suk et al.

(10) Patent No.: US 9,838,224 B2
(45) Date of Patent: Dec. 5, 2017

(54) RECEPTION APPARATUS OF MULTI INPUT MULTI OUTPUT SYSTEM AND RECEPTION SIGNAL PROCESSING METHOD

(71) Applicant: Electronics and Telecommunications Research Institute, Daejeon (KR)

(72) Inventors: Mi Kyung Suk, Daejeon (KR); Bong Su Kim, Daejeon (KR); Min Soo Kang, Daejeon (KR); Kwang Seon Kim, Daejeon (KR); Woo Jin Byun, Daejeon (KR); Young Seung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/220,707

(22) Filed: Jul. 27, 2016

(65) Prior Publication Data
US 2017/0054487 A1  Feb. 23, 2017

(30) Foreign Application Priority Data
Aug. 21, 2015  (KR) .................. 10-2015-0117883

(51) Int. Cl.
*H04L 25/02* (2006.01)
*H04L 25/03* (2006.01)
*H04B 7/0413* (2017.01)

(52) U.S. Cl.
CPC ........ *H04L 25/02* (2013.01); *H04L 25/03331* (2013.01); *H04B 7/0413* (2013.01); *H04L 25/0206* (2013.01); *H04L 25/0214* (2013.01)

(58) Field of Classification Search
CPC ....... H04B 7/08; H04B 7/0413; H04B 7/0669
See application file for complete search history.

(56) References Cited

U.S. PATENT DOCUMENTS

| | | | |
|---|---|---|---|
| 2004/0192216 A1* | 9/2004 | Marzetta .............. | H04B 7/0413 455/67.14 |
| 2005/0071650 A1 | 3/2005 | Jo et al. | |
| 2006/0209978 A1* | 9/2006 | Jungnickel ........... | H04B 7/0413 375/267 |
| 2010/0316163 A1* | 12/2010 | Forenza ................ | H04B 7/024 375/296 |
| 2011/0312357 A1* | 12/2011 | Haustein ............... | H04B 7/022 455/502 |
| 2012/0146852 A1 | 6/2012 | Park et al. | |

FOREIGN PATENT DOCUMENTS

| | | |
|---|---|---|
| KR | 1020100070555 A | 6/2010 |
| KR | 1020150083274 A | 7/2015 |

* cited by examiner

*Primary Examiner* — Janice Tieu
(74) *Attorney, Agent, or Firm* — William Park & Associates Ltd.

(57) ABSTRACT

The present invention relates to a reception apparatus. The reception apparatus includes a plurality of reception antennas; and a signal processing unit configured to use reception characteristic of the plurality of reception antennas, wherein the signal processing unit comprises a channel estimation unit configured to respectively estimate a channel response matrix of each signal received via the plurality of reception antennas, and a coding unit configured to define a coding matrix based on an inverse matrix of the estimated channel response matrix, and to obtain a final output signal corresponding to each reception antenna by applying the coding matrix to each received signal.

12 Claims, 7 Drawing Sheets

RECEPTION APPARATUS OF MULTI INPUT MULTI OUTPUT SYSTEM AND RECEPTION SIGNAL PROCESSING METHOD

CROSS-REFERENCE TO RELATED APPLICATION

This application claims the benefit of priority to Korean Patent Application No. 10-2015-0117883, filed on Aug. 21, 2015 in the Korean Intellectual Property Office, the disclosure of which is incorporated herein in its entirety by reference.

BACKGROUND OF THE INVENTION

Field of the Invention

The present disclosure relates to a reception apparatus of multi input multi output system and a reception signal processing method, and more particularly, to a technology of processing a reception signal without a channel response feedback in a multi-input multi-output (MIMO) system of a line of sight (LOS) channel environment.

Description of the Related Art

In a MIMO system in a LOS channel environment, transmission and reception antennas are arranged in such a manner that reaching path difference of a signal received in a reception antenna from each transmission antenna becomes 90° ($\lambda/4$), so that an original signal is recovered through a simple signal processing for the received signal.

However, a gap between antennas should be adjusted every installation depending on a frequency used for the transmission and reception of signal and a link distance between the transmission antenna and the reception antenna.

In addition, even though the link distance between each antenna is the same, the distance between the antennas is significantly increased as frequency becomes lower, which significantly restricts the installation.

SUMMARY OF THE INVENTION

The present disclosure has been made in view of the above problems, and provides a reception apparatus of multi input multi output system which processes a reception signal without a restriction of distance between the transmission antenna and the reception antenna without a channel response feedback in a multi-input multi-output (MIMO) system of a line of sight (LOS) channel environment, and a reception signal processing method.

The present disclosure further provides a reception apparatus of multi input multi output system which processes a signal received via a reception antenna regardless of a channel frequency and/or a reception angle of channel, and a reception signal processing method.

In accordance with an aspect of the present disclosure, a reception apparatus includes: a plurality of reception antennas; and a signal processing unit configured to use reception characteristic of the plurality of reception antennas, wherein the signal processing unit comprises a channel estimation unit configured to respectively estimate a channel response matrix of each signal received via the plurality of reception antennas, and a coding unit configured to define a coding matrix based on an inverse matrix of the estimated channel response matrix, and to obtain a final output signal corresponding to each reception antenna by applying the coding matrix to each received signal. The coding unit applies the coding matrix to a first signal received by a first reception antenna and erases the estimated channel response matrix from the first signal through the coding matrix. The first signal includes a first channel and a second channel, and the final output signal corresponding to the first reception antenna is obtained by erasing the second channel from the first signal. The coding unit applies the coding matrix to a second signal received by a second reception antenna and erases the estimated channel response matrix from the second signal through the coding matrix. The second signal includes a first channel and a second channel, and the final output signal corresponding to the second reception antenna is obtained by erasing the first channel from the second signal. The coding unit applies the coding matrix for a noise component contained in each received signal. The reception antenna is a reception side antenna of a multiple-input multiple-output (MIMO) system in a M×M line of sight (LOS) channel environment, when M>1. The reception antenna is a reception side antenna of a multiple-input multiple-output (MIMO) system in a M×M line of sight (LOS) channel environment, when N>M>1.

In accordance with another aspect of the present disclosure, a method of processing a reception signal includes: estimating a channel response matrix corresponding to each signal received via a plurality of reception antennas; defining a coding matrix based on an inverse matrix of the estimated channel response matrix; applying the coding matrix to each received signal; and obtaining a final output signal corresponding to each reception antenna from the signal to which the coding matrix is applied. Applying the coding matrix to each received signal includes applying the coding matrix to a first signal received by a first reception antenna and erasing the estimated channel response matrix from the first signal through the coding matrix. The first signal includes a first channel and a second channel, and the final output signal corresponding to the first reception antenna is obtained by erasing the second channel from the first signal. Applying the coding matrix to each received signal includes applying the coding matrix to a second signal received by a second reception antenna and erasing the estimated channel response matrix from the second signal through the coding matrix. The second signal includes a first channel and a second channel, and the final output signal corresponding to the second reception antenna is obtained by erasing the first channel from the second signal. Applying the coding matrix to each received signal includes applying the coding matrix for a noise component contained in each received signal.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
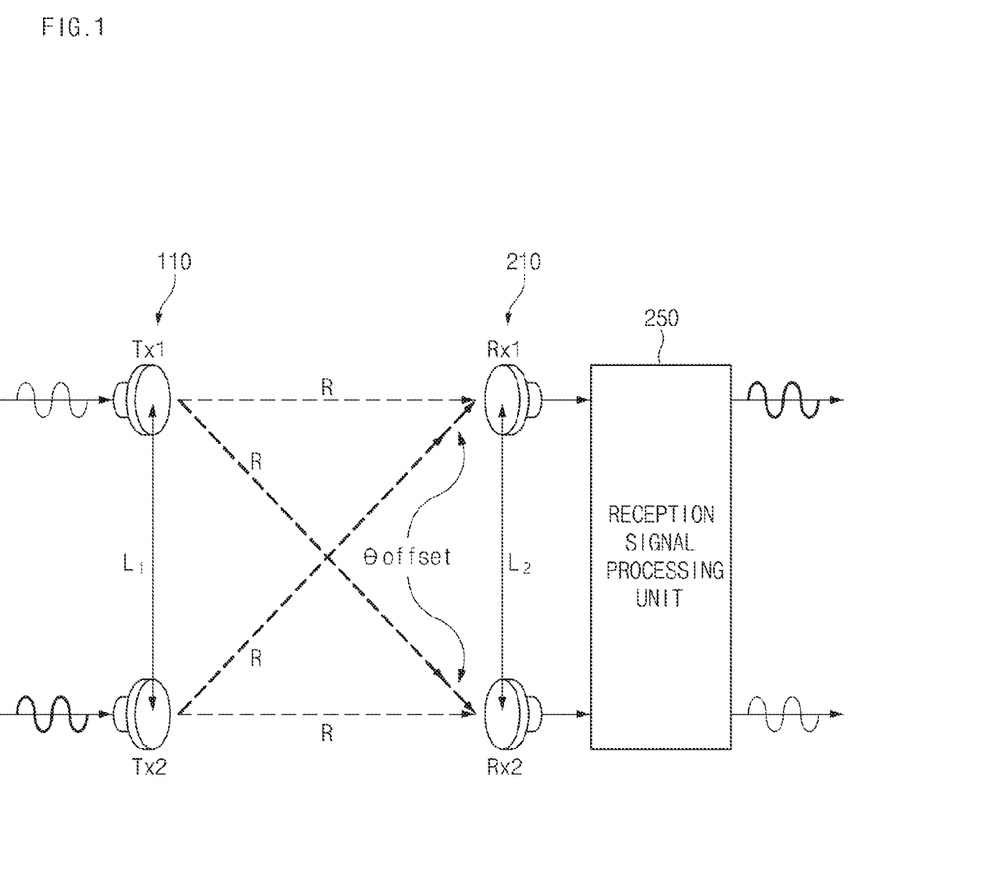
FIG. 1 is a diagram illustrating a configuration of a MIMO system according to an embodiment of the present disclosure.

FIG. 1 is a diagram illustrating a configuration of a MIMO system according to an embodiment of the present disclosure.

FIG. 1 illustrates a configuration of a Multiple-Input Multiple-Output (MIMO) system based on a 2×2 Line of Sight (LOS) channel environment, and two antennas may be arranged in a transmission side and a receiving side, and an antenna arranged in the receiving side, i.e., a reception antenna 210 may receive a signal transmitted from a transmission antenna 110.

At this time, the signal received via the reception antenna 210 may include each channel transmitted from two transmission antennas 110.

Thus, the reception apparatus of a MIMO system according to the present disclosure (hereinafter referred to as "reception apparatus") may include a reception signal processing unit 250 configured to change reception characteristic for each channel of the transmission antenna for the received signal.

For example, in the reception signal processing unit 250, signals received by two reception antennas 210, for example, a first reception antenna and a second reception antenna may include channels transmitted from the two transmission antennas 110.

In this case, the reception signal processing unit 250 of the reception apparatus may define a coding matrix by using each channel response characteristic of the transmission antenna 110 included in the signal received through each reception antenna 210, and, through this, may separate channels included in each reception signal, so that it is possible to obtain a channel of the signal transmitted from the transmission antenna 110 without a channel response feedback for the reception signal.

Hereinafter, a detailed configuration of the reception apparatus according to an embodiment of the present disclosure is described in more detail with reference to FIG. 2.

Figure 2:
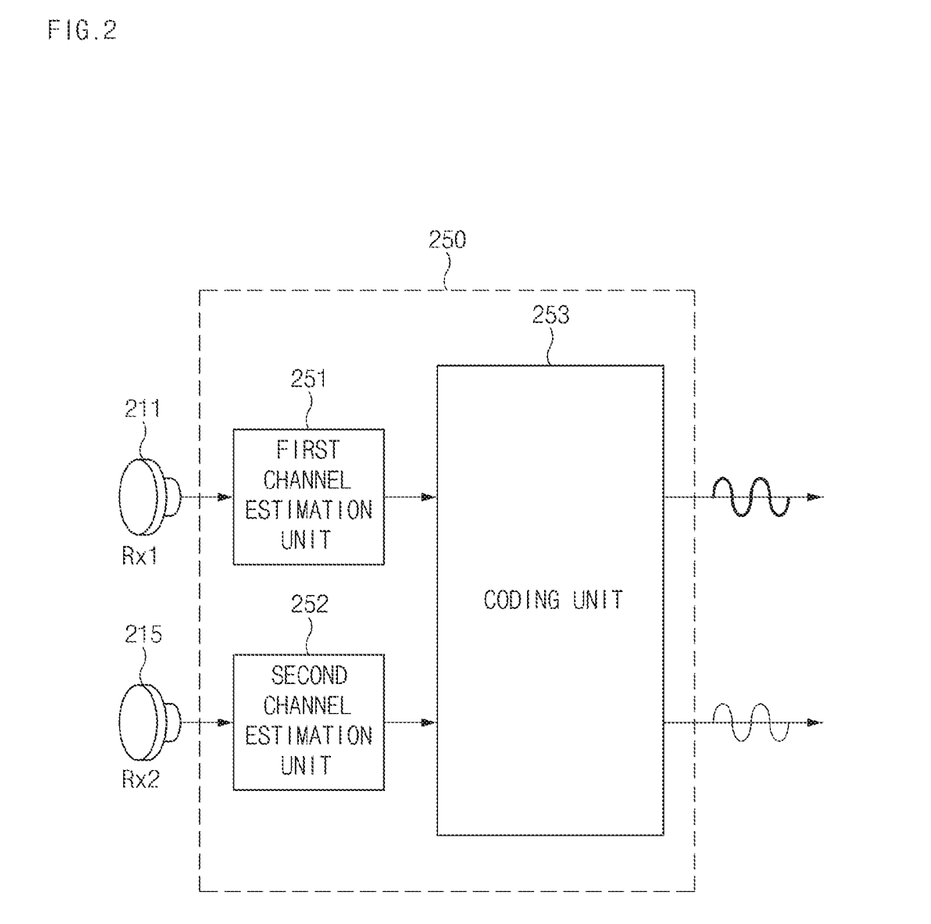
FIG. 2 is a diagram illustrating a configuration for a reception apparatus of a MIMO system according to an embodiment of the present disclosure.

FIG. 2 is a diagram illustrating a configuration for a reception apparatus of a MIMO system according to an embodiment of the present disclosure.

Referring to FIG. 2, the reception apparatus according to an embodiment of the present disclosure may include a plurality of reception antennas 211, 215 and a reception signal processing unit 250, as mentioned in FIG. 1.

Here, the reception antenna 211, 215 may be implemented with a plurality of antennas. For instance, in the case of a 2×2 LOS channel environment based MIMO system, the reception antenna 211, 215 may be provided with two antennas, that is, a first reception antenna 211 and a second reception antenna 215.

The following embodiment of the present disclosure is described based on a 2×2 LOS MIMO system. However, the present disclosure is not limited to any one embodiment, but it is obvious that it can be applied to a LOS MIMO system of M×M (M>1) or a LOS MIMO system structure of M×N (N>M>1).

Thus, the first reception antenna 211 and the second reception antenna 215 may receive signals transmitted from a first transmission antenna and a second transmission antenna respectively to transmit to the reception signal processing unit 250. Here, a first signal received via the first reception antenna 211 may include a first channel and a second channel transmitted from two transmission antennas. Similarly, a second signal received via the second reception antenna 215 may also include the first channel and the second channel transmitted from two transmission antennas, respectively.

The reception signal processing unit 250 may obtain the first channel and the second channel by using a reception characteristic for a first signal and a second signal received via the first reception antenna 211 and the second reception antenna 215. In this case, the reception signal processing unit 250 may estimate a channel response for the first signal and the second the signal received via the first reception antenna 211 and the second reception antenna 215, and may take a coding matrix of a channel response signal for the first signal and the second signal, thereby separating each channel included in the first signal and the second signal.

Here, the reception signal processing unit 250 may include a channel estimation unit and a coding unit 253.

Similarly to the reception antenna, a plurality of channel estimation units may be provided, and it is assumed that there is one to one correspondence between a plurality of channel estimation units and a plurality of reception antennas. In other words, the channel estimation unit may be provided with a first channel estimation unit 251 corresponding to the first reception antenna 211 and a second channel estimation unit 252 corresponding to the second reception antenna 215.

The first channel estimation unit 251 may estimate a channel response for the first signal received by the first reception antenna 211. In this case, the first channel estimation unit 251 may calculate a channel response matrix for each channel included in the first signal. Thus, the first channel estimation unit 251 may estimate a first channel response signal by applying the calculated channel response matrix to the first signal.

In addition, the second channel estimation unit 252 may estimate a channel response for the second signal received by the second reception antenna 215. In this case, the second channel estimation unit 252 may calculate a channel response matrix for each channel included in the second signal. Thus, the second channel estimation unit 252 may estimate a second channel response signal by applying the calculated channel response matrix to the second signal.

The first signal r1 received by the first reception antenna 211 and the second signal r2 received by the second reception antenna 215 may be expressed as the following Equation 1.

$$\begin{bmatrix} r_1 \\ r_2 \end{bmatrix} = \begin{bmatrix} 1 & e^{j\phi} \\ e^{j\phi} & 1 \end{bmatrix} \begin{bmatrix} x_1 \\ x_2 \end{bmatrix} + \begin{bmatrix} n_1 \\ n_2 \end{bmatrix} \quad \text{[Equation 1]}$$

Here, x1 denotes a first channel transmitted from the transmission antenna, x2 denotes a second channel transmitted from the transmission antenna, n1 denotes a noise component added to the first signal when the first signal is transmitted to the reception antenna from the transmission antenna, and n2 denotes a noise component added to the second signal when the second signal is transmitted to the reception antenna from the transmission antenna.

At this time, the first signal received through the first reception antenna may include the first channel x1 and the second channel x2, and the second signal received through the second reception antenna may also include the first channel x1 and the second channel x2.

In addition, $$\begin{bmatrix} 1 & e^{j\phi} \\ e^{j\phi} & 1 \end{bmatrix}$$

denotes a channel response matrix (hereafter 'M1'). The first channel estimation unit 251 and the second channel estimation unit 252 may determine the characteristic of the first channel x1 and the second channel x2 and calculate the channel response matrix M1 as in Equation 1. Here, the first signal r1 received by the first reception antenna 211 may include the first channel x1 and the second channel x2, and the noise component n1 included in the first signal. In addition, the second signal r2 received by the second reception antenna 215 may include the first channel x1 and the second channel x2, and the noise component n2 included in the second signal.

After calculating the channel response matrix M1, the first channel estimation unit 251 and the second channel estimation unit 252 may output the first signal r1 received by the first reception antenna 211 and the second signal r2 received by the second reception antenna 215 to the coding unit 253 respectively.

Thus, the coding unit 253 may define the coding matrix for the first signal r1 received by the first reception antenna 211 and the second signal r2 received by the second reception antenna 215 from the first channel estimation unit 251 and the second channel estimation unit 252.

Here, the coding unit 253 may define the coding matrix by using an inverse matrix of the channel response matrix included in the first signal r1 received by the first reception antenna 211 and the second signal r2 received by the second reception antenna 215.

The coding unit 253 may apply the previously defined coding matrix and may erase the second channel x2 component from the first signal r1 received by the first reception antenna 211, and may erase the first channel x1 component from the second signal r2 received by the second reception antenna 215.

At this time, the coding unit 253 may apply the coding matrix for the noise component included in the first signal r1 received by the first reception antenna 211 and the second signal r2 received by the second reception antenna 215.

The first signal r1 received by the first reception antenna 211 and the second signal r2 received by the second reception antenna 215 to which the coding matrix is applied by the coding unit 253 may be expressed as the following Equation 2.

$$\begin{bmatrix} s_1 \\ s_2 \end{bmatrix} = \begin{bmatrix} 1 & e^{j\phi} \\ e^{j\phi} & 1 \end{bmatrix}^{-1} \begin{bmatrix} r_1 \\ r_2 \end{bmatrix}$$ [Equation 2]

-continued
$$= \begin{bmatrix} 1 & e^{j\phi} \\ e^{j\phi} & 1 \end{bmatrix}^{-1} \begin{bmatrix} 1 & e^{j\phi} \\ e^{j\phi} & 1 \end{bmatrix} \begin{bmatrix} x_1 \\ x_2 \end{bmatrix} + \begin{bmatrix} 1 & e^{j\phi} \\ e^{j\phi} & 1 \end{bmatrix}^{-1} \begin{bmatrix} n_1 \\ n_2 \end{bmatrix}$$

$$= \begin{bmatrix} x_1 \\ x_2 \end{bmatrix} + \begin{bmatrix} 1 & e^{j\phi} \\ e^{j\phi} & 1 \end{bmatrix}^{-1} \begin{bmatrix} n_1 \\ n_2 \end{bmatrix}$$

Here, x1 denotes a first channel of a transmission signal, x2 denotes a second channel of a transmission signal, r1 denotes a first signal received by the first reception antenna 211, r2 denotes a second signal received by the second reception antenna 215, n1 denotes a noise component included in the first signal, n2 denotes a noise component included in the second signal, s1 is a final output signal of the first reception antenna 211 and an estimated transmission first channel which is separated through the channel response estimation of the first signal, and s2 is a final output signal of the second reception antenna 215 and an estimated transmission second channel which is separated through the channel response estimation of the second signal.

That is, s1, s2 may be obtained by finally estimating x1, x2 signals, actually transmitted by the transmission side antenna, through the channel estimation unit and the coding unit. The difference between x1 and s1, and the difference between x2 and s2 may be determined by the noise component and the accuracy of the estimated channel response.

In addition, $$\begin{bmatrix} 1 & e^{j\phi} \\ e^{j\phi} & 1 \end{bmatrix}^{-1}$$

denotes a coding matrix (hereafter, 'M2'). As shown in Equation 2, it can be determined that the coding matrix M2 is an inverse matrix of the channel response matrix of Equation 1.

As shown in Equation 2, the channel response matrix M1

$$\begin{bmatrix} 1 & e^{j\phi} \\ e^{j\phi} & 1 \end{bmatrix}$$

included in the first channel x1 and the second channel x2 of the first signal r1 received by the first reception antenna 211 and the second signal r2 received by the second reception antenna 215 may be erased by the coding matrix M2

$$\begin{bmatrix} 1 & e^{j\phi} \\ e^{j\phi} & 1 \end{bmatrix}^{-1}.$$

In the present disclosure, it is available even in the case of an environment having a channel response such as $$\begin{bmatrix} e^{j\phi_1} & e^{j\phi_2} \\ e^{j\phi_3} & e^{j\phi_4} \end{bmatrix}$$

in a general channel environment, as well as in the case of the symmetry channel response like the above embodiment. That is, the channel estimation unit 251, 252 may estimate each channel response component, and the coding unit 253 may apply the inverse matrix of the estimated channel response.

As described above, the reception apparatus according to the present disclosure may be able to process the signal of each channel received through the reception antenna without the feedback for the channel response in a MIMO system of the LOS channel environment.

Figure 3A:
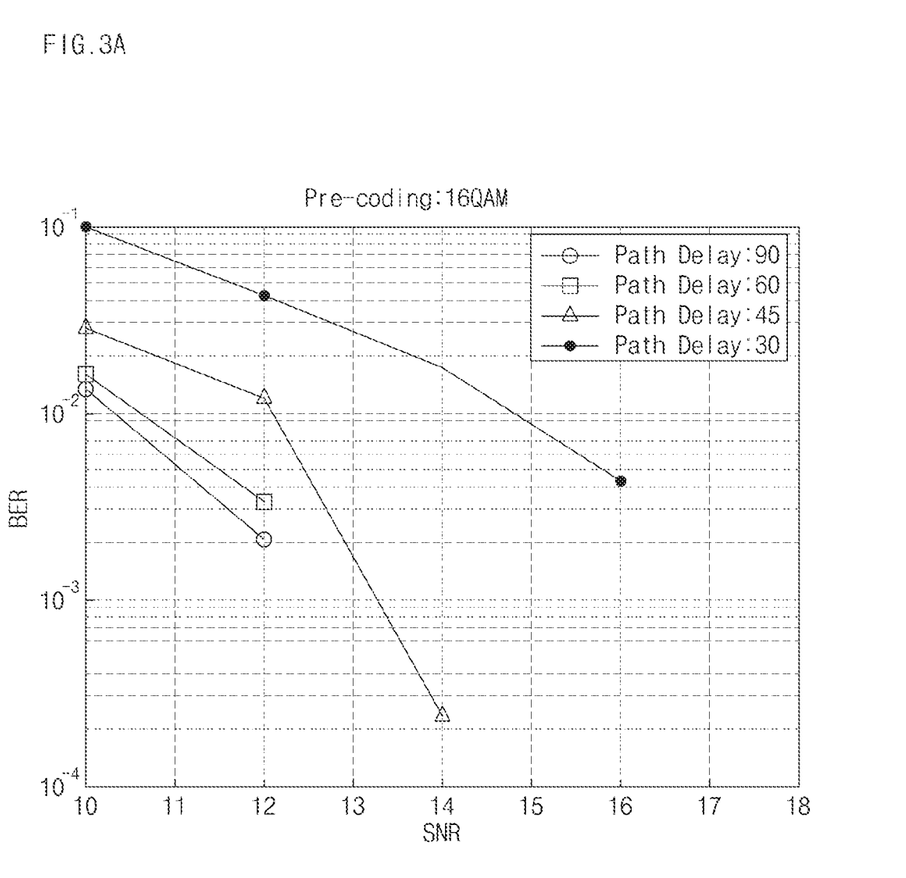
FIGS. 3A and 3B are a graph illustrating a BER performance depending on a reaching path for a reception apparatus of a MIMO system according to an embodiment of the present disclosure.
Figure 3B:
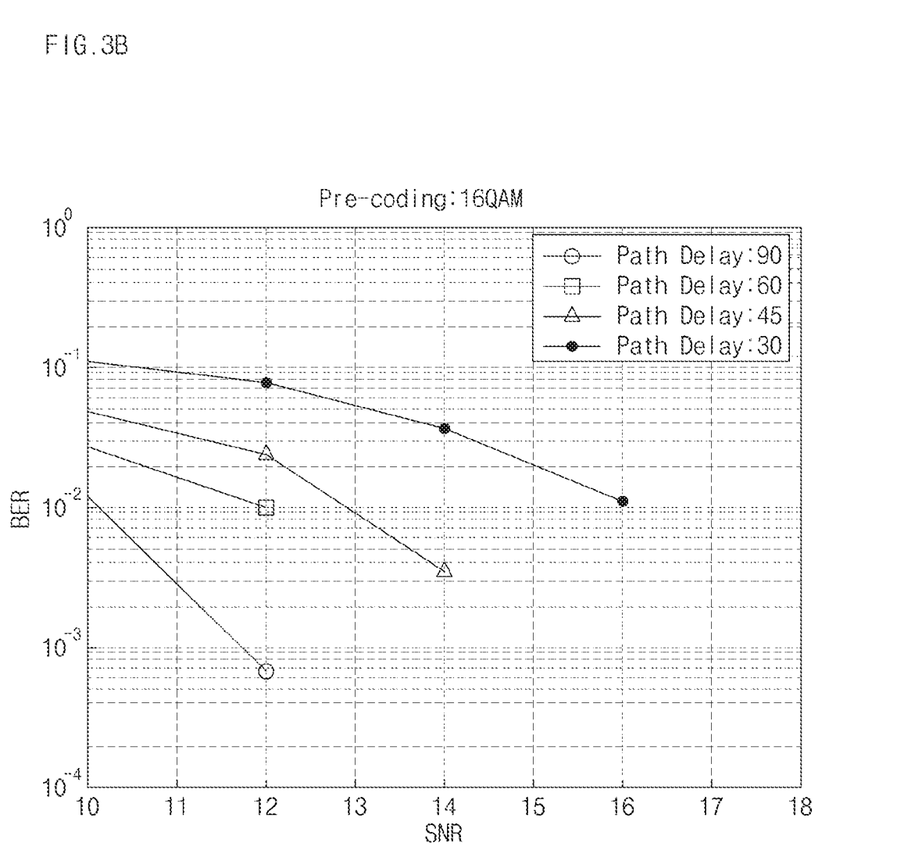

FIG. 3A and FIG. 3B are a graph illustrating a Bit Error Rate (BER) performance depending on a reaching path for a reception apparatus of a MIMO system according to an embodiment of the present disclosure.

First, FIG. 3A illustrates a BER performance when the reaching path is path 90 degree, 60 degree, 45 degree, 30 degree, when the channel estimation unit and the coding unit are applied to the reception apparatus to transmit a signal to the reception apparatus. Meanwhile, FIG. 3B illustrates the case the channel estimation unit and the coding unit are applied to the reception apparatus according to the present disclosure, and illustrates the BER performance when the reaching path is path 90 degree, 60 degree, 45 degree, 30 degree. As shown in FIG. 3B, it can be determined that the system performance is not much different from the BER standpoint.

Thus, the reception apparatus according to the present disclosure may be able to process the reception signal while maintaining the existing BER performance for a reaching path without an additional feedback for a signal received from the transmission apparatus.

Figure 4A:
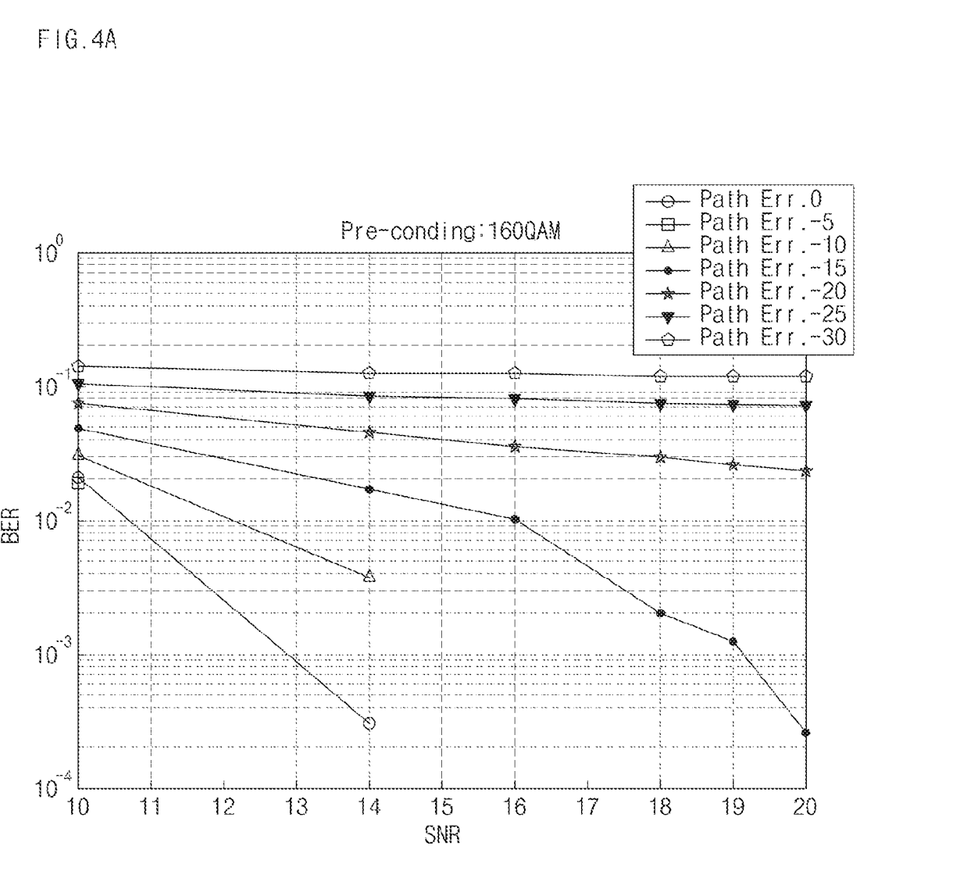
FIGS. 4A and 4B are a graph illustrating a BER performance depending on a channel response error for a reception apparatus of a MIMO system according to an embodiment of the present disclosure.
Figure 4B:
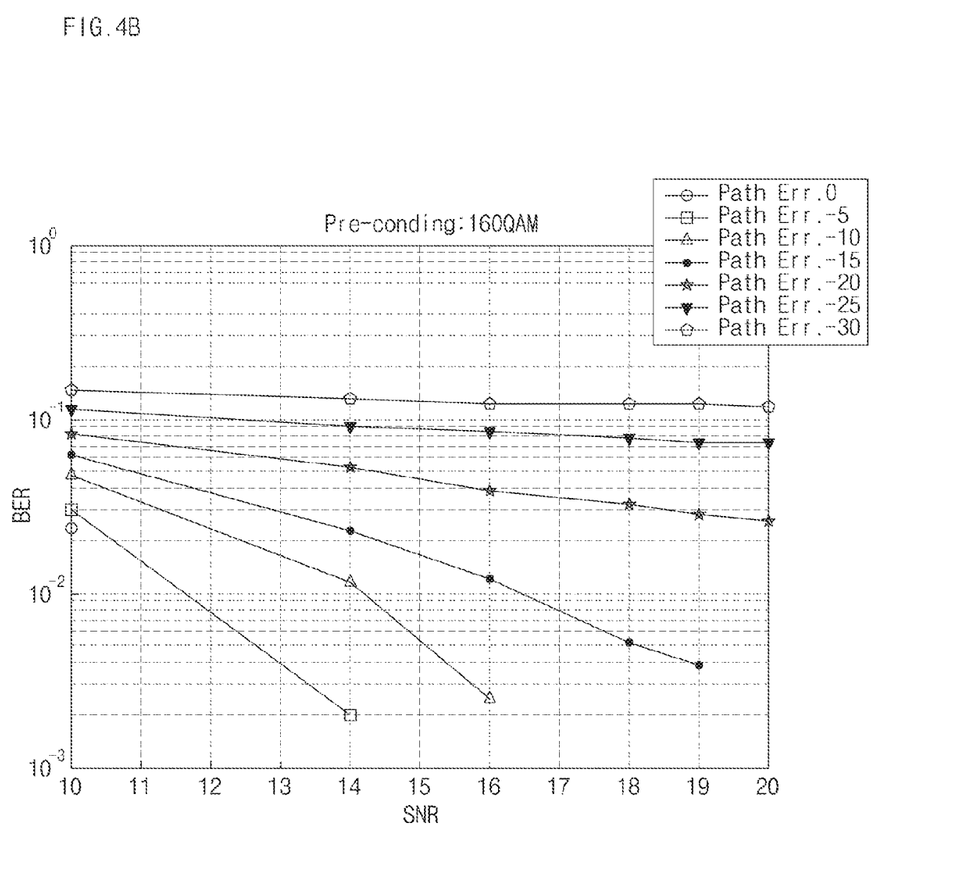

In addition, FIG. 4A and FIG. 4B are a graph illustrating a BER performance depending on a channel response error for a reception apparatus of a MIMO system according to an embodiment of the present disclosure.

First, FIG. 4A illustrates a BER performance depending on a channel response error in the case of transmitting a signal to the reception apparatus by previously applying the coding unit to the transmission apparatus similarly to FIG. 3A. FIG. 4B illustrates a BER performance depending on a channel response error in the reception apparatus according to the present disclosure.

Referring to FIG. 4A and FIG. 4B, it can be seen that the BER performance at the channel response error −30 degree to 0 degree shows a similar pattern.

Thus, the reception apparatus according to the present disclosure may be able to process the reception signal while maintaining the existing BER performance for the channel response error without an additional feedback for a signal received from the transmission apparatus.

Accordingly, the reception apparatus according to the present disclosure may omit a channel information feedback control signal without deteriorating the performance of the system, and the amplitude variation of the channel in an actual environment and the installation environment in which the reaching path from the transmission to the reception is not symmetrical may be considered. In addition, the present disclosure may be extended to the M×N MIMO structure.

Hereinafter, the operation flow of the above mentioned reception apparatus according to the present disclosure is described in more detail.

Figure 5:
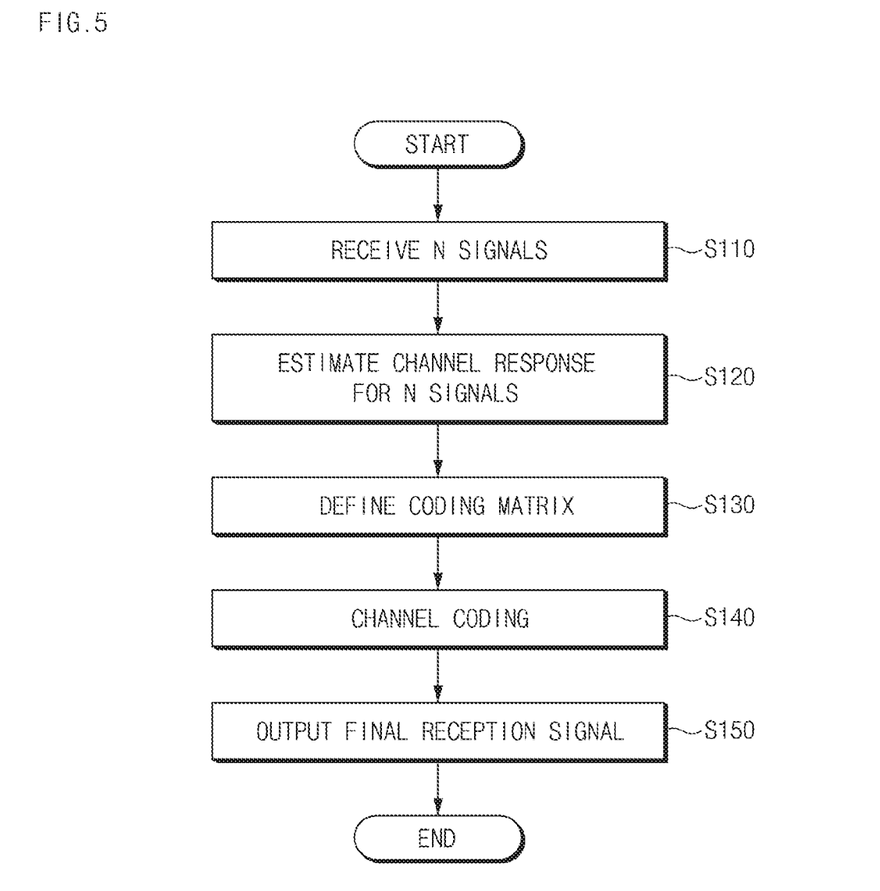
FIG. 5 is a flowchart illustrating an operation flow for a reception signal processing method according to an embodiment of the present disclosure.

FIG. 5 is a flowchart illustrating an operation flow for a reception signal processing method according to an embodiment of the present disclosure.

As shown in FIG. 5, the reception apparatus may receive n signals through n reception antennas in the LOS MIMO system structure (S110). For instance, the reception apparatus in the 2×2 LOS MIMO system structure may receive two signals respectively through two reception antennas. In this case, the reception apparatus may estimate the channel response for n signals received via the reception antenna (S120).

Here, the reception apparatus may define a coding matrix based on the estimated channel response matrix (S130). For instance, the reception apparatus may define the inverse matrix of the channel response matrix as the coding matrix.

In addition, the reception apparatus may code two signals received via the reception antenna with respect to the coding matrix defined in step 'S130' (S140). In the case of two signals received in step 'S140', as the coding matrix which is the inverse matrix of the channel response matrix is applied, the channel response matrix may be erased, and thus, two transmission signals included in each reception signal may be separated from each other.

Accordingly, the reception apparatus may output the estimated transmission signal having separated channels as a final output signal (S150).

According to the present disclosure, a feedback control of sending a channel response from the reception to the transmission is not required, and a reception signal may be processed without a constraint such as the arrival distance difference between a direct path signal and a delay path signal in each reception antenna, the distance between transmission antennas and the distance between reception antennas and the center position between the transmission antenna and the reception antenna.

In addition, according to the present disclosure, a control structure of processing feedback for the reception signal may be eliminated to reduce a system overhead.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A reception apparatus comprising:
    a plurality of reception antennas; and
    a signal processing unit configured to use reception characteristic of the plurality of reception antennas,
    wherein the signal processing unit comprises a signal processor that executes computer executable program code, the computer executable program code comprising:
        channel estimation program code that respectively estimates a channel response matrix of each signal received via the plurality of reception antennas, and
        coding program code that defines a coding matrix based on an inverse matrix of the estimated channel response matrix, and that obtains a final output signal corresponding to each reception antenna by applying the coding matrix to each received signal,
    wherein the coding program code applies the coding matrix to a first signal received by a first reception antenna of the plurality of reception antennas and erases the estimated channel response matrix from the first signal through the coding matrix.

2. The reception apparatus of claim 1, wherein the first signal comprises a first signal first channel and a first signal second channel, and the final output signal corresponding to the first reception antenna is obtained by erasing the first signal second channel from the first signal.

3. The reception apparatus of claim 1, wherein the program code applies the coding matrix to a second signal received by a second reception antenna of the plurality of reception antennas and erases the estimated channel response matrix from the second signal through the coding matrix.

4. The reception apparatus of claim 1, wherein the second signal comprises a second signal first channel and a second signal second channel, and the final output signal corresponding to the second reception antenna is obtained by erasing the second signal first channel from the second signal.

5. The reception apparatus of claim 1, wherein the coding unit applies the coding matrix for a noise component contained in each received signal.

6. The reception apparatus of claim 1, wherein the reception antenna is a reception side antenna of a multiple-input multiple-output (MIMO) system in a M×M line of sight (LOS) channel environment, M being a whole number>1.

7. The reception apparatus of claim 1, wherein the reception antenna is a reception side antenna of a multiple-input multiple-output (MIMO) system in a M×N line of sight (LOS) channel environment, N being a whole number>M which is a whole number>1.

8. A method of processing a reception signal, the method comprising:
   estimating a channel response matrix corresponding to each signal received via a plurality of reception antennas;
   defining a coding matrix based on an inverse matrix of the estimated channel response matrix;
   applying the coding matrix to each received signal; and
   obtaining a final output signal corresponding to each reception antenna from the signal to which the coding matrix is applied,
   wherein applying the coding matrix to each received signal comprises applying the coding matrix to a first signal received by a first reception antenna of the plurality of reception antennas and erasing the estimated channel response matrix from the first signal through the coding matrix.

9. The method of claim 8, wherein the first signal comprises a first signal first channel and a first signal second channel, and the final output signal corresponding to the first reception antenna is obtained by erasing the first signal second channel from the first signal.

10. The method of claim 8, wherein applying the coding matrix to each received signal comprises applying the coding matrix to a second signal received by a second reception antenna of the plurality of reception antennas and erasing the estimated channel response matrix from the second signal through the coding matrix.

11. The method of claim 8, wherein the second signal comprises a second signal first channel and a second signal second channel, and the final output signal corresponding to the second reception antenna is obtained by erasing the second signal first channel from the second signal.

12. The method of claim 8, wherein applying the coding matrix to each received signal comprises applying the coding matrix for a noise component contained in each received signal.

* * * * *